(12) United States Patent
Devine et al.

(10) Patent No.: US 6,837,671 B2
(45) Date of Patent: Jan. 4, 2005

(54) APPARATUS FOR PRECISELY MANIPULATING ELONGATE OBJECTS ADJACENT TO AND SUCH AS ENERGIZED OVERHEAD HIGH VOLTAGE TRANSMISSION LINES

(76) Inventors: Clifford William Devine, RR 1, S. 77A, C.6, Oliver, British Columbia (CA), V0H 1P0; Daniel Neil O'Connell, R.R. #2, Site 4, Compartment 7, Oliver, British Columbia (CA), V0H 1T0

( * ) Notice: Subject to any disclaimer, the term of this patent is extended or adjusted under 35 U.S.C. 154(b) by 0 days.

(21) Appl. No.: 10/248,784

(22) Filed: Feb. 18, 2003

(65) Prior Publication Data

US 2003/0156936 A1 Aug. 21, 2003

Related U.S. Application Data

(60) Provisional application No. 60/357,116, filed on Feb. 19, 2002.

(51) Int. Cl.$^7$ .................................................. B66C 1/00
(52) U.S. Cl. ....................................... 414/680; 212/168
(58) Field of Search ................................ 414/680, 555, 414/589; 212/168; 234/81.51, 67.31, 67.33

(56) References Cited

U.S. PATENT DOCUMENTS

| | | | |
|---|---|---|---|
| 3,472,402 A | * | 10/1969 | Priefert ........................ 414/555 |
| 3,753,508 A | * | 8/1973 | Carpenter .................... 414/680 |
| 3,834,560 A | | 9/1974 | Miller |
| 4,280,785 A | | 7/1981 | Albrecht |
| 4,432,691 A | | 2/1984 | Sterner |
| 4,493,426 A | | 1/1985 | Sterner |
| 4,561,552 A | | 12/1985 | Sterner |
| 4,676,713 A | | 6/1987 | Voelpel |
| 4,721,213 A | | 1/1988 | Eitel |
| 4,775,276 A | | 10/1988 | McMillan |
| 4,784,565 A | | 11/1988 | Giroux |
| 5,169,281 A | | 12/1992 | Boisture |
| 5,538,207 A | | 7/1996 | O'Connel et al. |
| 6,129,226 A | | 10/2000 | Donovan |
| 6,280,119 B1 | | 8/2001 | Ryan et al. |

* cited by examiner

Primary Examiner—Donald W. Underwood
(74) Attorney, Agent, or Firm—Anthony C. Edwards (57) ABSTRACT

A remotely-controlled manipulator for mounting to the end of a telescopic boom, includes at least one releasable support mounted to a cross member for releasably holding or clamping an elongate object.

17 Claims, 13 Drawing Sheets

APPARATUS FOR PRECISELY MANIPULATING ELONGATE OBJECTS ADJACENT TO AND SUCH AS ENERGIZED OVERHEAD HIGH VOLTAGE TRANSMISSION LINES

CROSS REFERENCE TO RELATED APPLICATIONS

This application claims priority from U.S. Provisional Patent Application No. 60/357,116 filed Feb. 19, 2002 entitled Apparatus for Precisely Manipulating Elongate Objects Adjacent to Energized Overhead High Voltage Transmission Lines.

BACKGROUND OF INVENTION

This invention relates to a device which is attached to the boom of a crane, for the precise and remote manipulation of an object such as a cross-arm or insulator, adjacent to energized overhead high voltage transmission lines, or the lines themselves.

The replacement and installation of cross arm members or insulators on overhead transmission towers is generally accomplished, whenever possible, while the electrical transmission lines are energized. It is common to find several rows of transmission towers supporting two or more vertically separate electrical transmission lines located in relatively close proximity. This confined overhead working area emphasizes the need for the precise elevating and manipulation of objects so as to avoid accidental arcing between the energized lines and the object with obvious dire consequences to workmen and machinery. A convenient practise is to employ a helicopter to elevate such objects to workmen on the tower. However, where a tower supports vertically separated energized lines, wind gusts and rotor downwash make this practice difficult and may require the de-energising of a portion of the electrical transmission line. Such de-energizing is undertaken only as a last resort. The present invention provides a relatively easily controllable apparatus, which is able to elevate and accurately position power transmission lines or elongate, electrically conductive structural members such as supporting arms for power lines and insulators within the generally confined overhead work space associated between vertically separated electrical transmission lines or between horizontally spaced transmission towers. Further, the present invention permits elongated electrically conductive structural members, such as supporting cross arms for power lines and insulators, to be elevated generally parallel to and above one or more energized power lines with minimum displacement therefrom, thereby avoiding accidental contact between the lines and the electrically conductive structural members. Once elevated to the required position, for example, a replacement cross arm may be arcuately rotated in a horizontal plane into a preselected position adjacent to the electrical transmission line-supporting tower and generally at right angles to the power lines.

SUMMARY OF INVENTION

The present invention may be characterized as an arm, hingedly connectable to the distal end of a hydraulically actuated crane boom and arcuately adjustable by means of an actuator such as a hydraulic ram in a direction generally parallel to the boom so as to effectively change the angular disposition and orientation between the crane boom and the hinged arm. By that adjustment, the arm may be positioned generally horizontally regardless of the boom angle.

In normal operation, the crane boom is extended and raised to elevate the arm while holding an elongate object such a power line supporting cross arm in a controlled manner, adjacent to one or more energized power lines. The hingedly connected arm is then manipulated to bring the cross arm being held into general parallel alignment with, but spaced vertically above or below, the energized power line. The boom is then swung in a horizontal plane to position the cross arm adjacent to the electrical transmission line-supporting tower, generally at right angles to the power lines without the danger of accidental contact with the energized power lines.

The present invention is, thus, in one aspect a device for the precise and remote manipulation of elongate objects adjacent to energized overhead high voltage transmission lines. The device includes in one preferred embodiment, a first and a second arm, where the first arm is rigidly mounted or otherwise fixedly positioned at the distal end of a crane boom and the second arm is hingedly connected to the first arm in proximity to the point of connection between the first arm and the crane boom. Second arm is arcuately adjustable, relative to both the first arm and the crane boom by means of a selectively, actuable actuator such as a hydraulic cylinder mounted so as to be positioned between the first and second arm. The second arm is arcuately adjustable in a direction generally parallel to the boom so as to effectively change the angular disposition between the crane boom and the second arm. By adjusting the angle between first and second arms, the second arm may be positioned in a generally horizontal attitude regardless of the angle of the crane boom and the connected first arm.

The second arm may have receptacles mounted to or otherwise positioned on the underside thereof. The receptacles releasably secure elongated electrically conductive structural members, such as supporting cross arms for power lines to the second arm. Arresting means are mounted or positioned on the underside of second arm to inhibit or prohibit longitudinal sliding translation of the cross arm relative to the second arm when the cross arm is mounted within the securing receptacles.

In summary then, for mounting to the end of a telescopic boom, the present invention may be summarized as a remotely-controlled manipulator for manipulating an elongate cross-arm. The manipulator may include at least one, or at least one pair of grapples, yokes, collars, clamps or the like (hereinafter releasable supports) mounted spaced apart along a rigid elongate member (hereinafter a cross member) for releasably grasping, holding or clamping one end of the cross arm so as to cantilever the cross arm from the cross member, away from the boom.

The cross member is mounted to the upper or free end of the boom, for example by means of a mounting member rigidly mounted to the upper or free end of the boom. The mounting member may be a boom extension member. The cross member supporting the releasable supports is pivotally mounted for pivotal or rotational movement in a vertical plane and, by rotation on the boom, in a horizontal planes. The cross-member pivots relative to the boom by pivotal actuating means. In one embodiment the cross member is pivotally mounted to the boom extension member for pivoting in the vertical planes. The cross member may be pivoted in the horizontal plane by, for example approximately fifteen degrees by rotation of the boom in order to allow alignment of the cross arm to the poles of the transmission structure. Without this horizontal plane movement, it may be virtually impossible to line up the cross arm totally parallel to the transmission poles.

A selectively and remotely actuable actuator such as a hydraulic cylinder or ram is mounted between the boom or boom extension member and the cross member for rotating or pivoting the cross member relative the boom or boom extension member. A cross arm in, and cantilevered by its first end from, the releasable supports is thereby selectively pivoted or rotated about its first end so as to be adjustable into a horizontal orientation.

In a preferred embodiment, the releasable support mounted on the cross member is at least one collar mounted to an underside of the cross member. The invention may also include at least one insulated extension member mounted at one end to the cross member and adapted at its opposite end for mounting to a single phase of a power transmission line.

The present invention allows for the cost effective transfer of the line, that is the existing phase, from the existing cross arm onto the new cross arm. Using insulated phase holders or extension members mounted on the cross member of the present invention, the existing phase is removed from the existing cross arm, and lowered to hang free. The existing cross arm is then cut-out and replaced with a new cross arm again using the present invention, this time without using the insulated members on the cross member for holding the single phase. The phase holders are then remounted to the cross member and the phase lifted for attachment to the new cross arm on the tower. In this fashion a single machine may be used to accomplish both the removing and replacement of the cross arm and the transmission line.

BRIEF DESCRIPTION OF DRAWINGS

FIGS. 12a–12g are side elevation views of the apparatus of FIG. 1, adapted for holding and manipulating power transmission lines by the use of insulated extensions.

DETAILED DESCRIPTION

Figure 1:
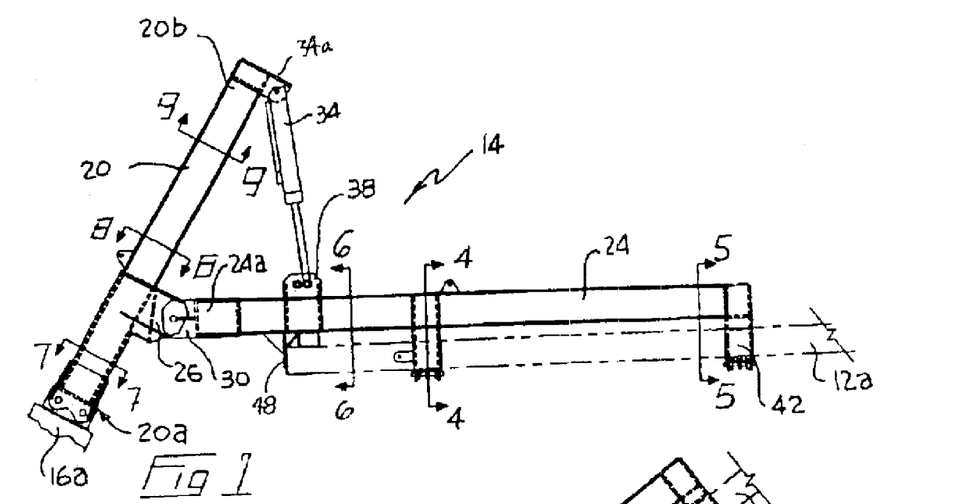
FIG. 1 is a side elevation view of the apparatus secured to the distal end of a crane boom and pivoted to a horizontal position.
Figure 1A:
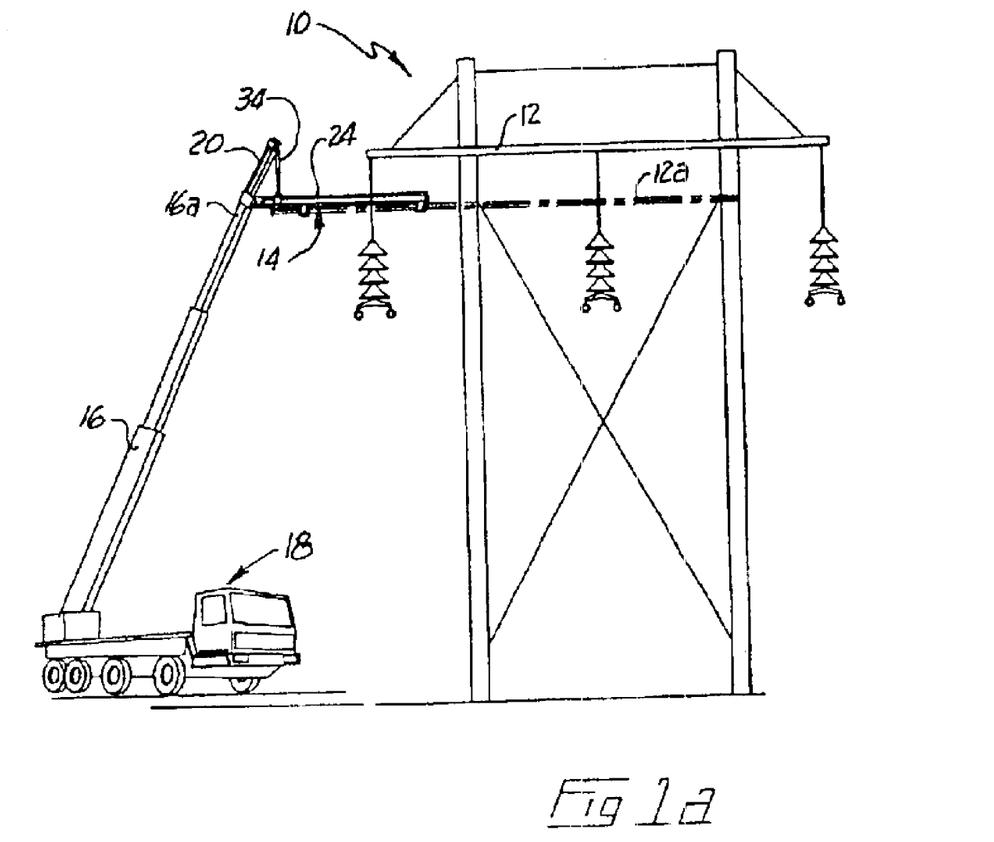
FIG. 1a, is a schematic elevation view of a high voltage electrical transmission tower with a replacement cross arm being elevated into position by a mobile crane using the present invention.

With reference to the drawing figures, wherein similar characters of reference denote corresponding parts in each view, FIG. 1a schematically illustrates a high voltage electrical transmission tower 10 having mounted thereon several cross arms 12. A replacement cross arm 12a (shown in dotted outline) is supported and positioned by a manipulating apparatus 14 according to the present invention, which is mounted to the distal end 16a of a telescopic boom 16 of mobile crane 18.

Figure 2:
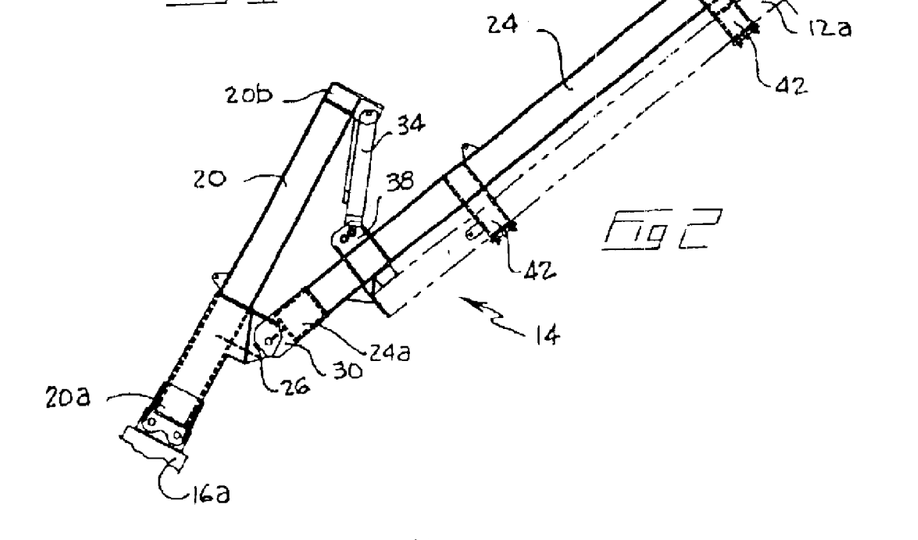
FIG. 2 is a side elevation view of the apparatus secured to the distal end of a crane boom prior to adjusting the angle of the second arm.
Figure 3:
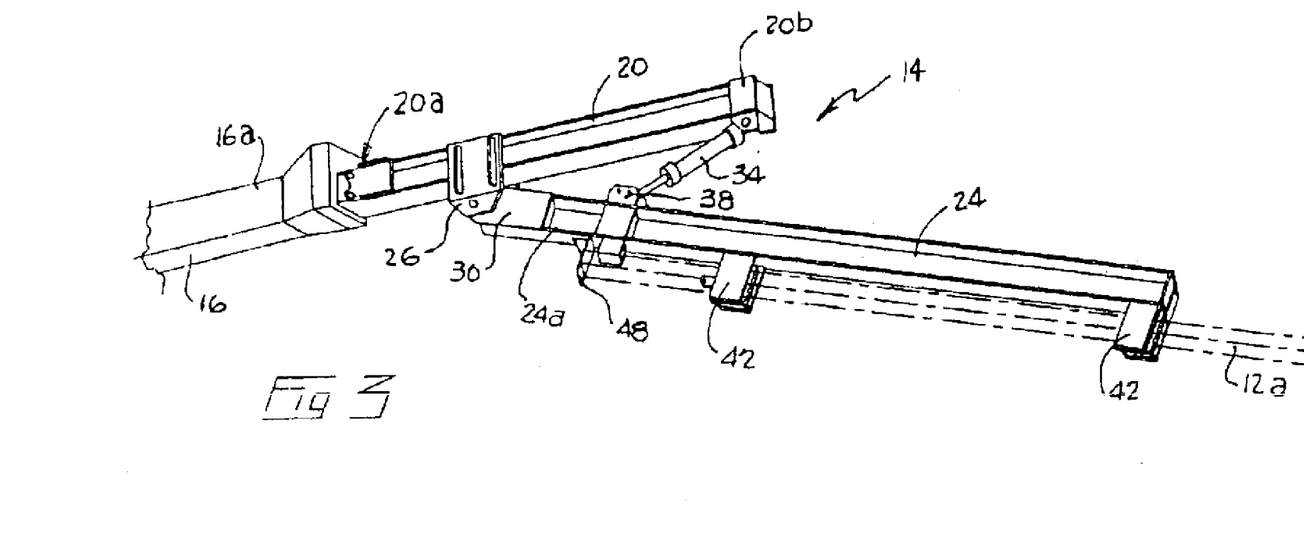
FIG. 3 is an isometric view of the present invention.

As better seen in FIGS. 1–3, manipulating apparatus 14 has first arm 20 fixedly mounted or secured, for example by bolting or welding, at end 20a, to distal end 16a of crane boom 16. A second arm 24 is hingedly or pivotally mounted or connected to first arm 20. Brackets 26 are welded to first arm 20 in proximity to end 20a. Corresponding brackets 30 are welded at end 24a of second arm 24. Brackets 30 are pivotally mounted to brackets 26. Selectively actuable hydraulic cylinder 34 is mounted so as to extend between distal or free end 20b of first arm 20 and attachment bracket 38 mounted to second arm 24. By actuation of cylinder 34, second arm 24 may be incrementally pivoted relative to first arm 20, for example, pivoted between a raised position generally or close to parallel to first arm 20 and a lowered position for example a position generally at, or close to being at right angles to first arm 20.

Figure 4:
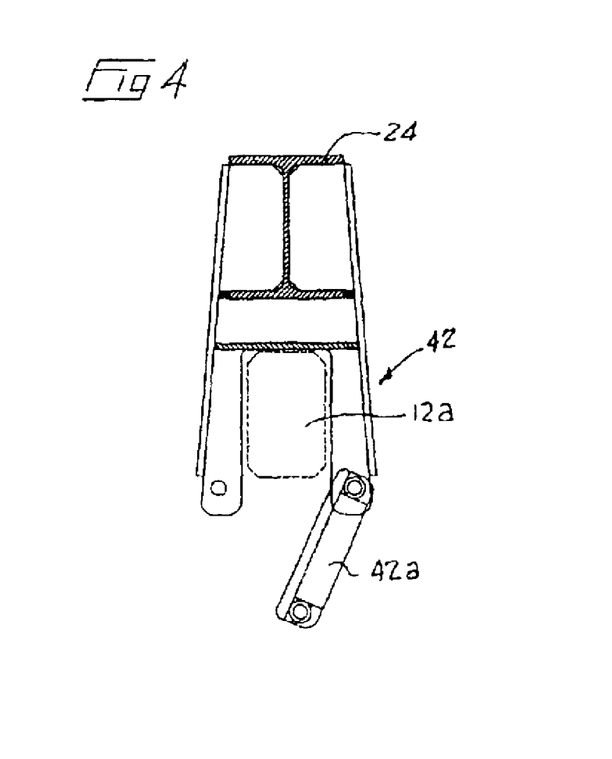
FIG. 4 is a sectional view along line 4—4 in FIG. 1.
Figure 5:
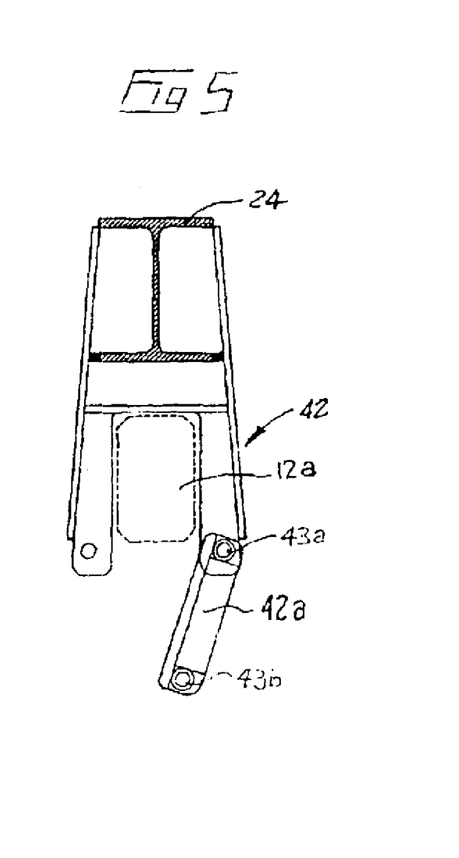
FIG. 5 is a sectional view along line 5—5 in FIG. 1.
Figure 6:
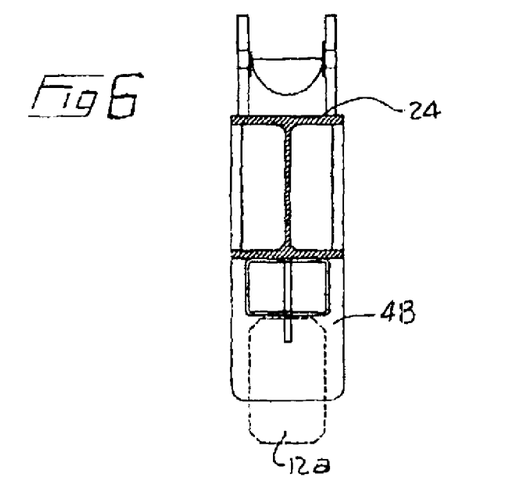
FIG. 6 is a sectional view along line 6—6 in FIG. 1.
Figure 7:
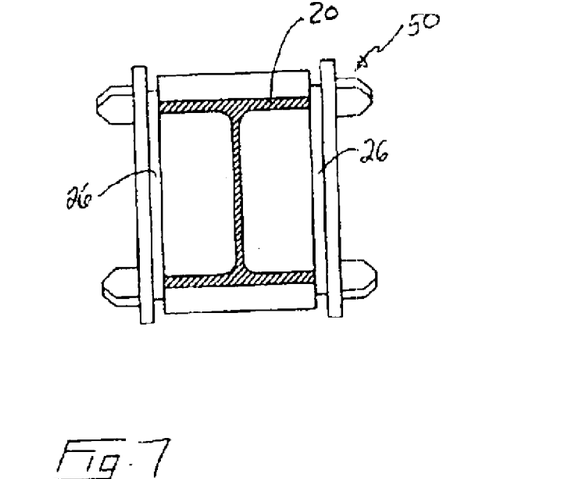
FIG. 7 is a sectional view along line 7—7 in FIG. 1.
Figure 8:
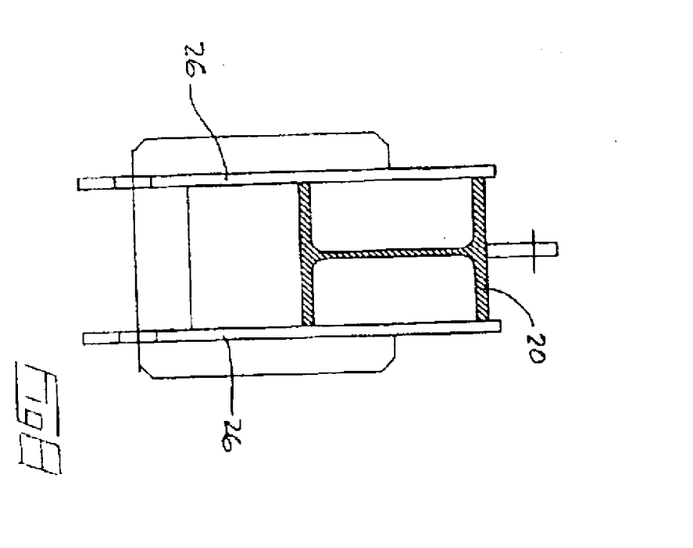
FIG. 8 is a sectional view along line 8—8 in FIG. 1.

A pair of cross arm retaining yokes or collars 42, as better seen in FIGS. 4 and 5, are secured as by welding, spaced apart along second arm 24. Collars 42 secure a replacement cross arm 12a so as to be releasably mounted snugly underneath second arm 24. Each collar 42 has a hinged arm or base 42a. Base 42 is pinned or bolted to the free ends of collars 42. Thus one bolt or shackle 43a may serve as a hinge or pivot, and the opposite bolt or shackle 43b may be inserted or removed to respectively lock or release base 42a to or from the free ends of collars 42. As better seen in FIG. 6, arresting plate 48 is mounted to second arm 24, for example near end 24a, to form a stop against which one end of cross arm 12a abuts when mounted in collars 42.

Figure 9:
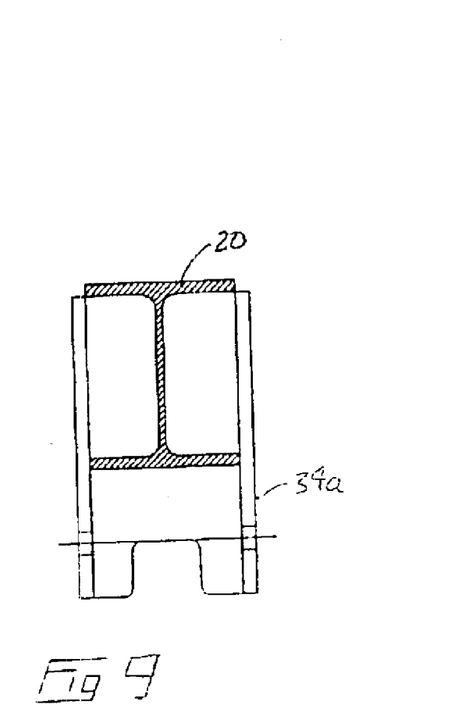
FIG. 9 is a sectional view along line 9—9 in FIG. 1.
Figure 10:
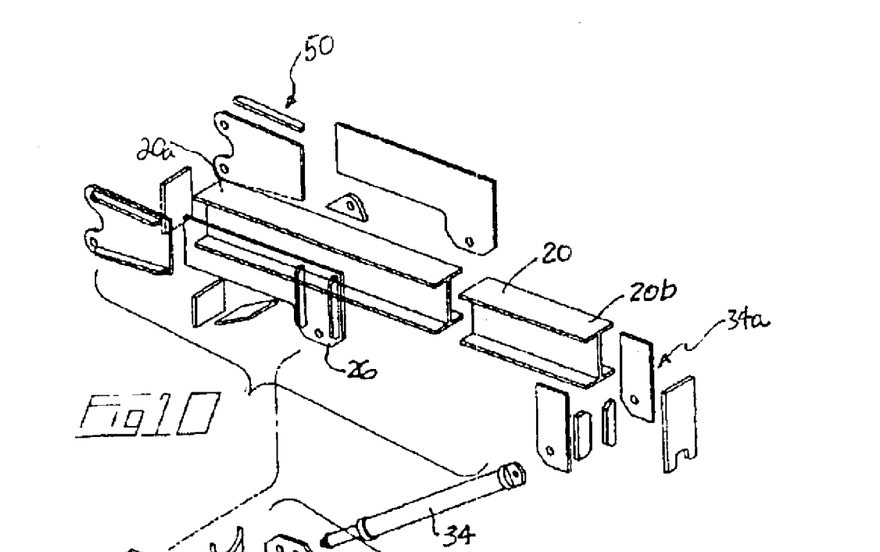
FIG. 10 is an exploded isometric view of the components of one embodiment of the first arm of the present invention.
Figure 11:
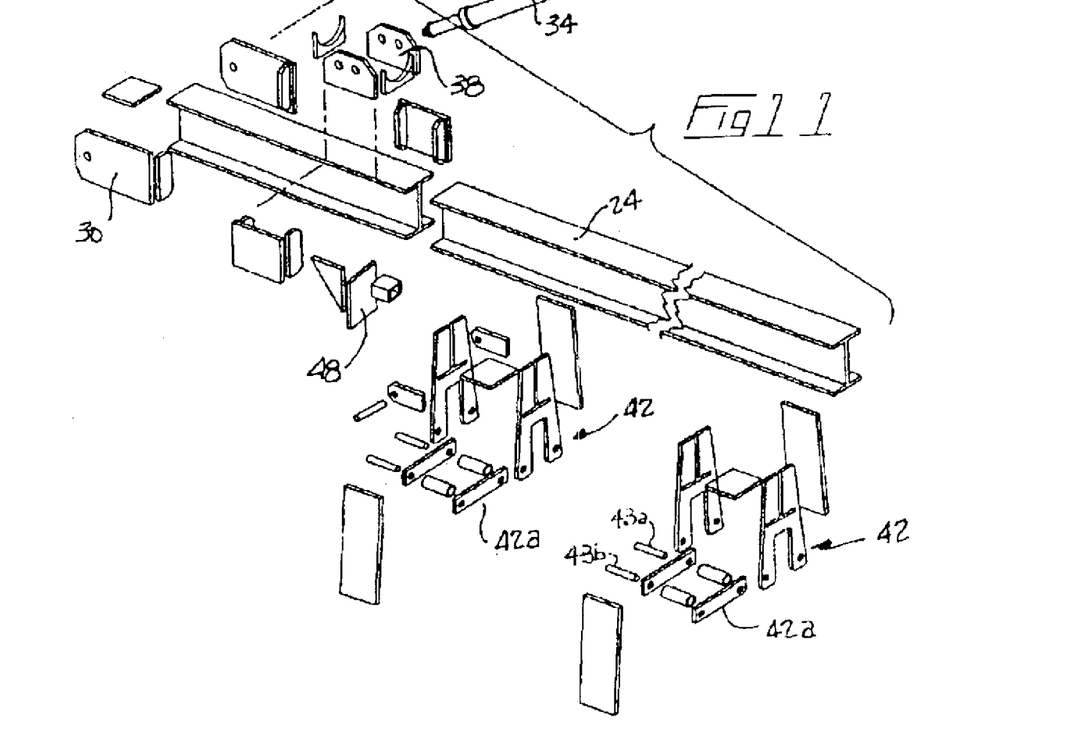
FIG. 11 is an exploded isometric view of the components of one embodiment of the second arm of the present invention.
Figure 12A:
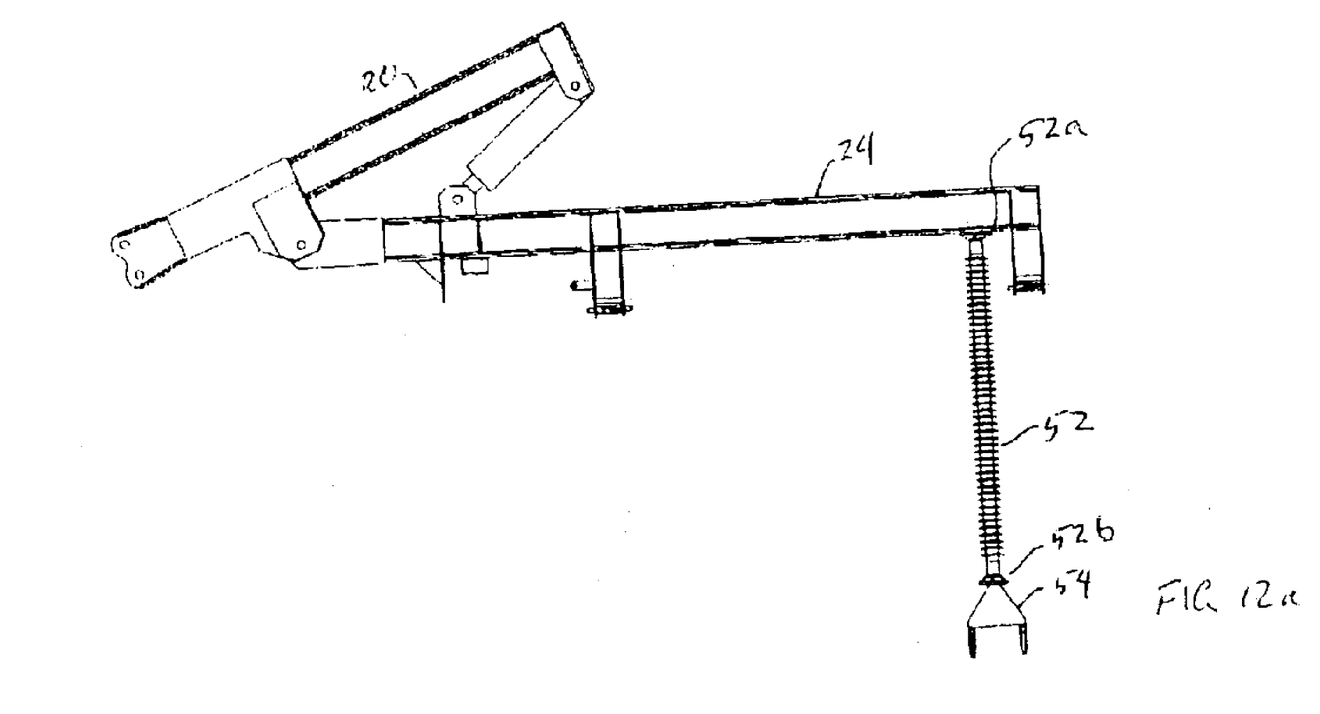
Figure 12B:
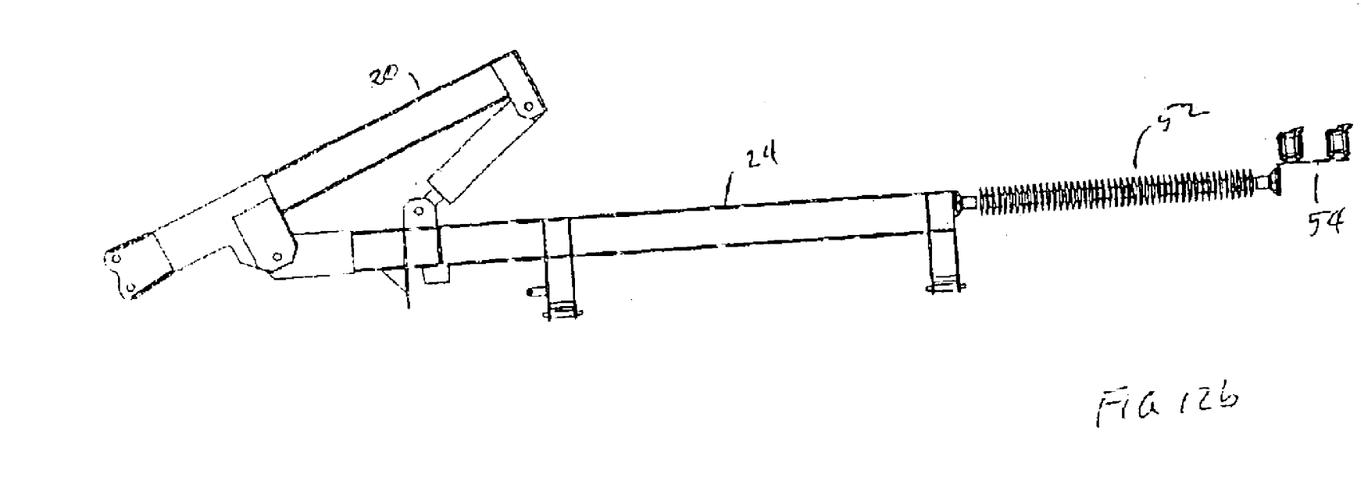
Figure 12C:
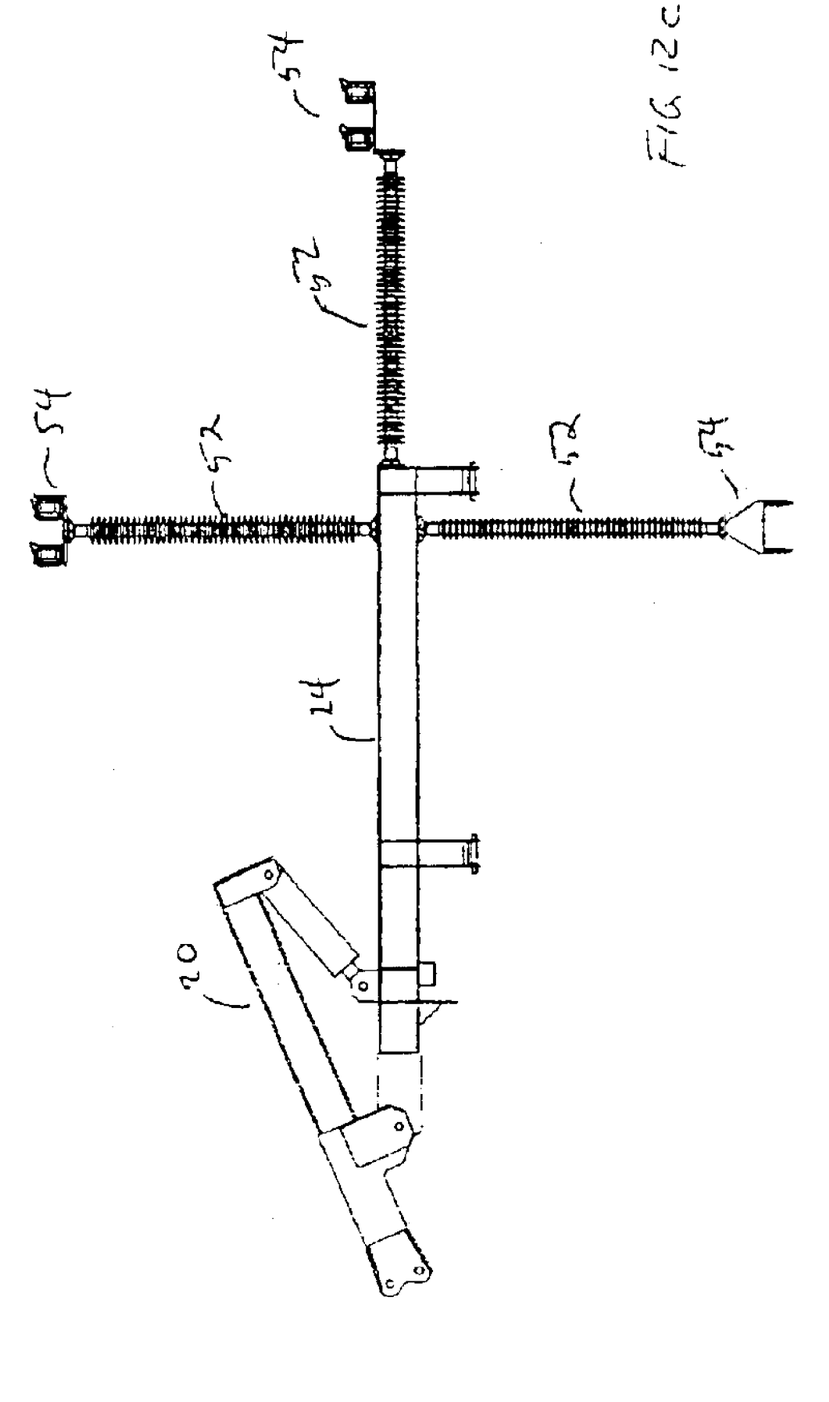
Figure 12D:
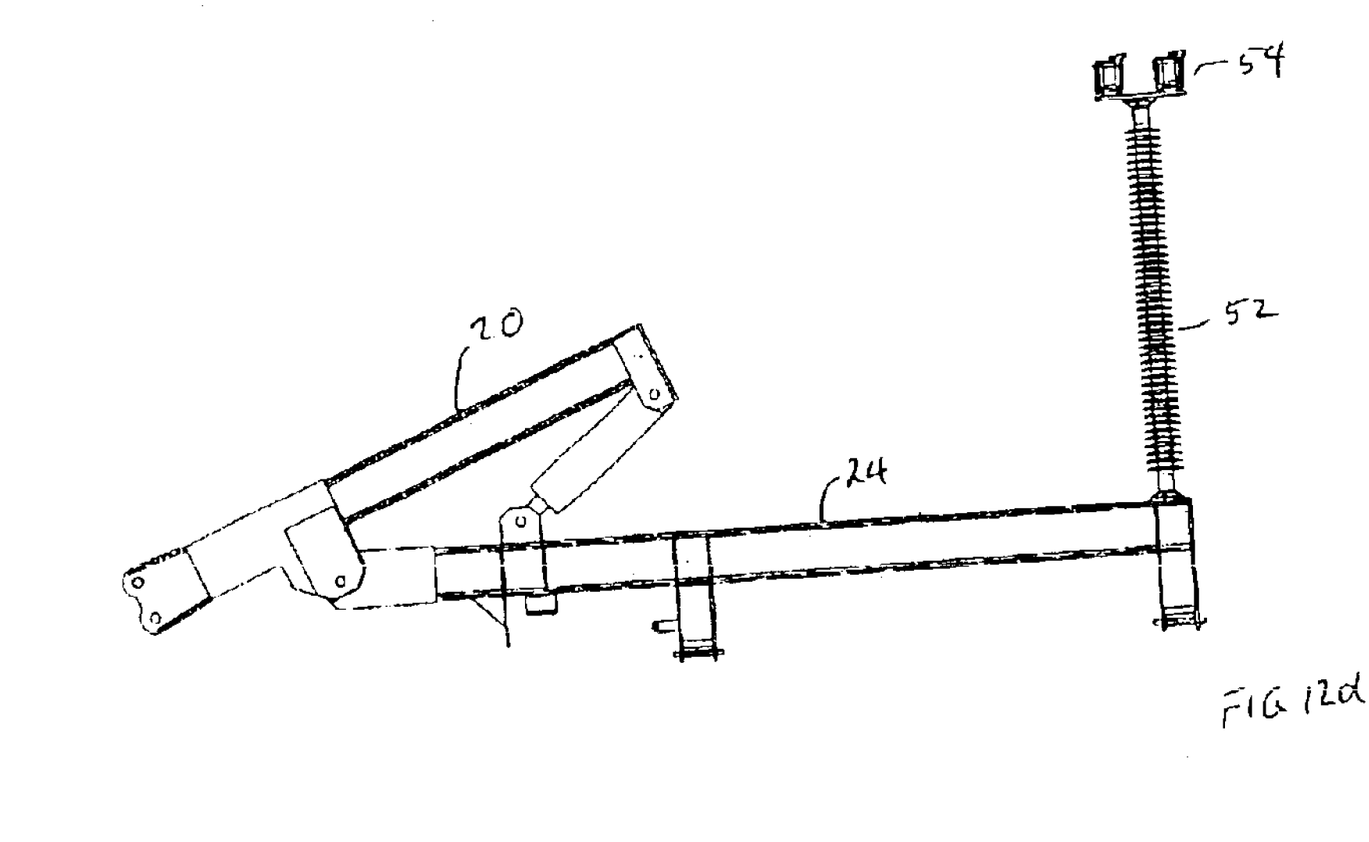
Figure 12E:
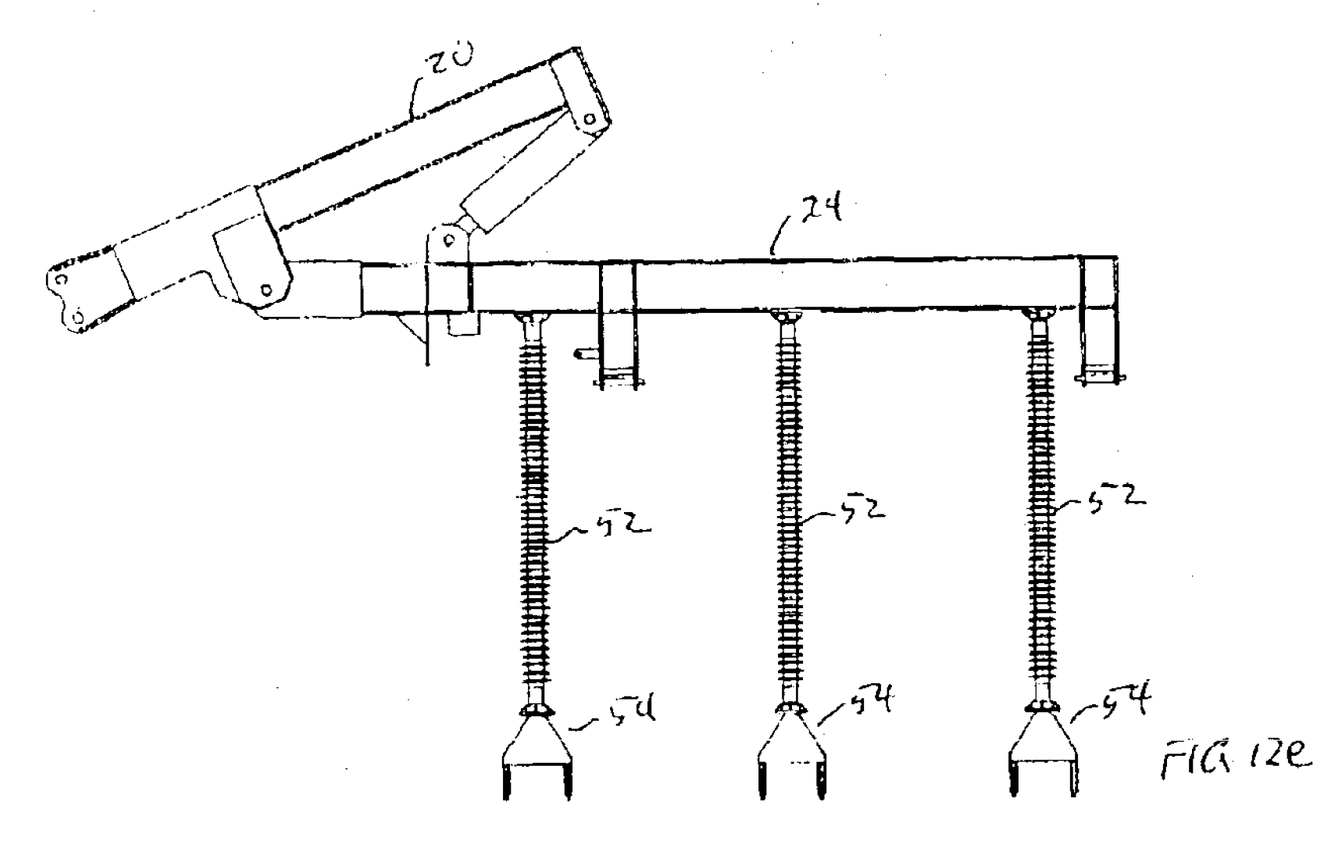
Figure 12G:
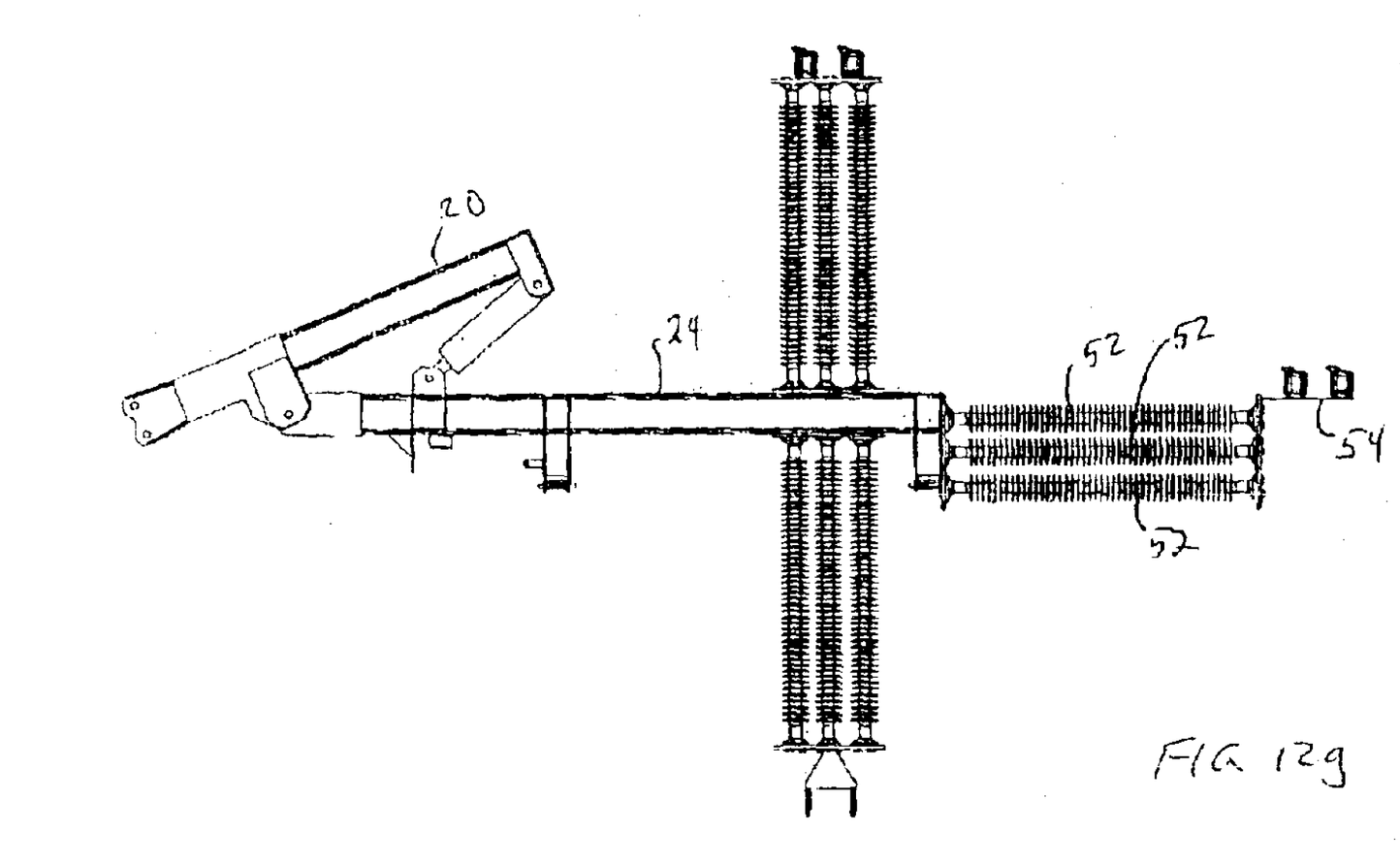
Figure 17A:
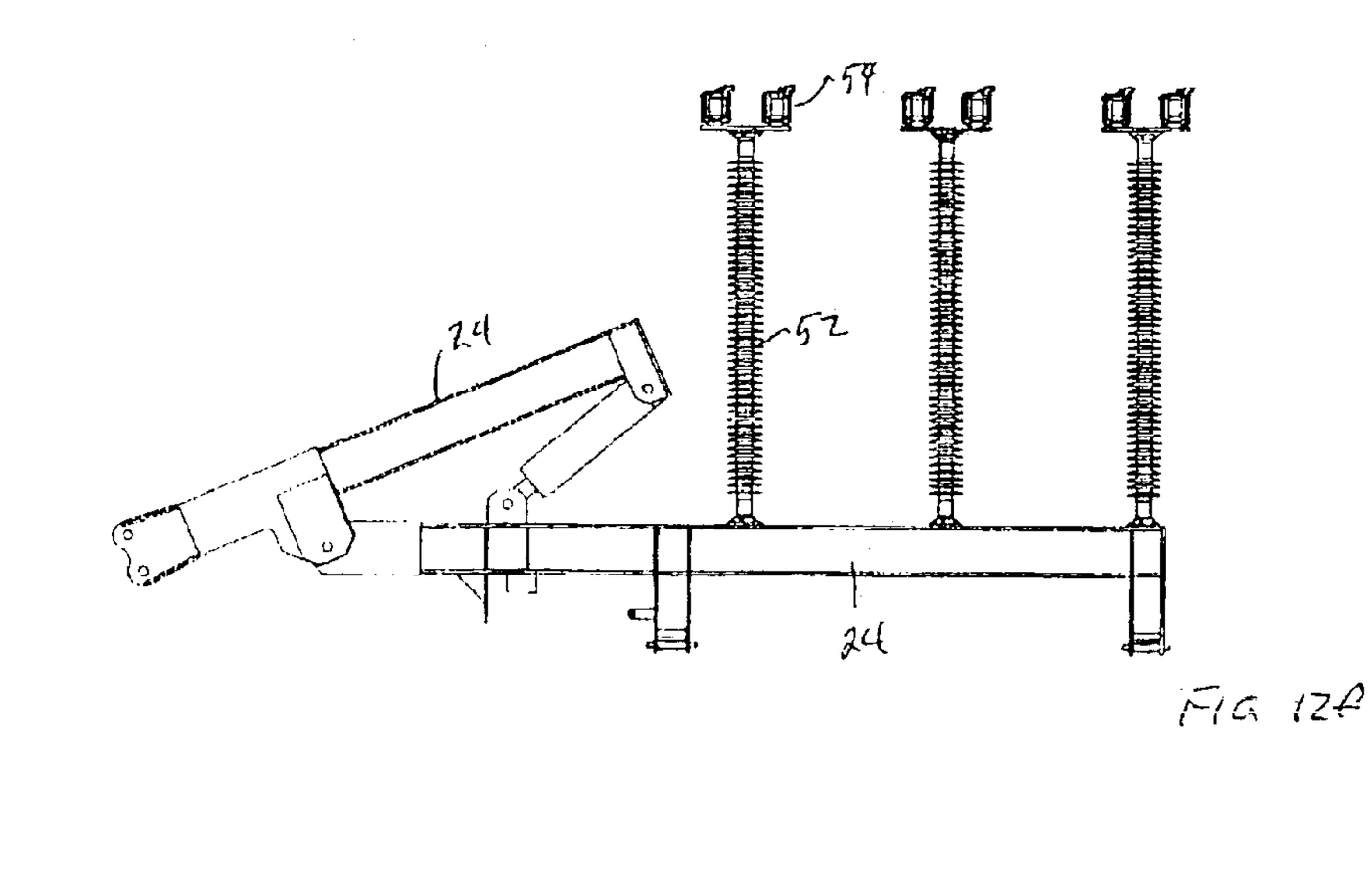

As seen in FIGS. 7–11, similar to second arm 24, first arm 20 may advantageously be an I-beam. End 20a may be journalled into an end support 50 so as to form a rigid extension from boom end 16a. Support 50 may be bolted or welded both to end 16a and to end 20a, for example so as to sandwich one end of brackets 26 against the outer edges of the flanges of the I-beam. As seen in FIG. 9, bracket 34a is rigidly mounted to end 20b so as to pivotally support the upper end of cylinder 34, the opposite end pivotally mounted to bracket 38.

As replacement cross arm 12a is elevated adjacent high voltage electrical transmission tower 10, it is positioned so as to extend outwardly from and generally parallel to boom 16 of mobile crane 18 in a manner which will avoid accidental contact with the high voltage power lines. Once elevated to the desired position, remote hydraulic actuation of cylinder 34, normally by the operator of mobile crane 18, rotates second arm 24 of manipulating apparatus 14 and the secured replacement cross arm 12, outwardly of boom 16 toward a generally horizontal alignment. In this alignment the crane boom can be manoeuvred to rotate apparatus 14 and replacement cross arm 12 in a generally horizontal plane toward transmission tower 10 free from accidental contact with the energized lines.

As seen in FIGS. 12a–12g, insulated rigid elongate extension members 52 may be mounted to cross member 24 at their base ends 52a. A power transmission line grapple or clamp or other releasable holding means or support 54 for releasably grasping a power line is mounted to the opposite distal end 52b of exte3nsion members 52. A plurality of members 52 may be mounted to cross member 24. They may be oriented in various radial orientations about cross member 24, for example, extending up from, depending down from, or linear to cross member 24, lying in a plane containing members 20 and 24.

As will be apparent to those skilled in the art in the light of the foregoing disclosure, many alterations and modificaare possible in the practice of this invention without departing from the spirit or scope thereof. Accordingly, the scope of the invention is to be construed in accordance with the substance defined by the following claims.

What is claimed is:

1. A remotely-controlled manipulator for mounting to the end of a telescopic boom, comprising:

at least one releasable support mounted to a cross member for releasably holding an elongate object wherein said releasable support is at least one collar mounted to and underside of said cross member, and further comprising at least one insulated extension member mounted at one end to said cross member and adapted at its opposite end for mounting to a single phase of a power transmission line.

2. The manipulator of claim 1 wherein said cross member is mountable to the distal end of the boom by means of a mounting member rigidly mounted to the distal end of the boom.

3. The manipulator of claim 2 wherein said mounting member is a boom extension member.

4. The manipulator of claim 3 wherein said cross member is pivotally mounted for pivotal movement, by pivotal actuating means, in a vertical plane relative to said boom extension member.

5. The manipulator of claim 4 wherein said cross member is pivotally mounted to said boom extension member for said pivotal movement in said vertical planes.

6. The manipulator of claim 5 wherein said actuating means is a selectively and remotely actuable actuator mounted between said boom extension member and said cross member for pivoting said cross member relative to said boom extension member.

7. A remotely-controlled manipulator comprising at least one releasable support mounted to a cross member for releasably holding an elongate object, said cross member mounted to the end of a telescopic boom, wherein said releasable support is at least one collar mounted to an underside of said cross member and further comprising at least one insulated extension member mounted at one end to said cross member and adapted at its opposite end for mounting to a single phase of a power transmission line.

8. The manipulator of claim 7 wherein said cross member is mounted to the distal end of the boom by means of a mounting member rigidly mounted to the distal end of the boom.

9. The manipulator of claim 8 wherein said mounting member is a boom extension member.

10. The manipulator of claim 9 wherein said cross member is pivotally mounted for pivotal movement, by pivotal actuating means, in a vertical plane relative to said boom extension member.

11. The manipulator of claim 10 wherein said cross member is pivotally mounted to said boom extension member for said pivotal movement in said vertical planes.

12. The manipulator of claim 11 wherein said actuating means is a selectively and remotely actuable actuator mounted between said boom extension member and said cross member for pivoting said cross member relative to said boom extension member.

13. A method for replacing the cross arm of a power line tower comprising the steps of:

a) providing a remotely-controlled manipulator which includes at least one releasable support mounted to a cross member for releasably holding a replacement cross arm adjacent said cross member, wherein said cross member is pivotally mounted by pivotal actuating means to the end of a telescopic boom for pivotal movement by actuation of said pivotal actuating means in a vertical plane relative to said boom, b) releasably mounting a replacement cross arm in said at least one releasable support, c) extending said boom so that said cross member is adjacent a cross arm mounting position on the tower, d) pivoting said cross member vertically so as to align horizontally said replacement cross arm, and between power transmission lines adjacent said tower, e) pivoting said boom so as to pivot said cross member horizontally to swing said replacement cross arm into said mounting position and mounting said replacement cross arm to said tower.

14. The method of claim 13 further comprising the initial steps of mounting an insulated extension member to said cross member, releasably mounting a distal end of said insulated extension member to a single phase of said power transmission lines corresponding to a cross arm to be replaced on said tower, dismounting said single phase from said cross arm to be replaced, lowering said single phase, and releasing said single phase so as hang free of said tower.

15. The method of claim 14 further comprising the further initial steps of dismounting said cross arm to be replaced from said tower following said releasing of said single phase.

16. The method of claim 15 further comprising the further initial step of dismounting said insulated extension member from said cross member following said releasing of said single phase and before said mounting of said replacement cross arm to said cross member.

17. The method of claim 16 further comprising the steps of, following said mounting of said replacement cross arm to said tower, re-mounting said insulated extension member to said cross member, re-mounting said single phase to said distal end of said insulated extension member, re-positioning said single phase into a re-mounting position adjacent said replacement cross arm, mounting said single phase to said replacement cross arm.

* * * * *